(12) United States Patent
Yang et al.

(10) Patent No.: US 7,661,833 B2
(45) Date of Patent: *Feb. 16, 2010

(54) LIGHT GUIDE DEVICE AND BACKLIGHT MODULE THEREWITH

(75) Inventors: Xing-Peng Yang, Bei-Jing (CN); Ying-Bai Yan, Bei-Jing (CN); Guo-Fan Jin, Bei-Jing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 196 days.

This patent is subject to a terminal disclaimer.

(21) Appl. No.: 11/309,238

(22) Filed: Jul. 17, 2006

(65) Prior Publication Data

US 2007/0076417 A1    Apr. 5, 2007

(30) Foreign Application Priority Data

Jul. 20, 2005    (CN)    .................. 2005 1 0036117

(51) Int. Cl.
*F21V 9/14*    (2006.01)
(52) U.S. Cl. .................... 362/19; 362/606; 362/626
(58) Field of Classification Search .............. 362/615, 362/617, 623, 626, 629, 19, 600; 428/167, 428/172; 349/61, 62, 64, 65
See application file for complete search history.

(56) References Cited

U.S. PATENT DOCUMENTS 7,237,940 B2 * 7/2007 Yu et al. .................. 362/621
2005/0195487 A1 * 9/2005 Yu et al. .................. 359/599
2006/0007700 A1 * 1/2006 Hsu et al. ................. 362/600
2006/0285359 A1 * 12/2006 Yang et al. ............... 362/615
2007/0076432 A1 * 4/2007 Yang et al. ............... 362/615

FOREIGN PATENT DOCUMENTS

JP    9-258221    10/1997
JP    2004-318038 A    11/2004

OTHER PUBLICATIONS

Ko-Wei Chien and Han-Ping D. Shieh; Design and Fabrication of an Integrated Polarized Light Guide for Liquid-Crystal-Display Illumination; pp. 1830-1834, vol. 43, No. 9, Applied Optics 2004.
Xingpeng Yang, Yingbai Yan and Guofan Jin; Polarized Light-Guide Plate for Liquid Crystal Display; pp. 8349-8356, vol. 13, No. 21, Optics Express 2005.

* cited by examiner

*Primary Examiner*—Anabel M Ton
*Assistant Examiner*—Kevin Spinella
(74) *Attorney, Agent, or Firm*—D. Austin Bonderer

(57) ABSTRACT

A light guide device (52) includes a light guide substrate (520) and a sub-wavelength grating (527). The light guide substrate has a light input surface (521), a light output surface (522) adjacent to the light input surface (521), a bottom surface (523) opposite to the light output surface (522). In the light guide plate, stress-induced birefringence is introduced to achieve the polarization state conversion. The SWG 527 located on the light output surface includes a top layer (525) and a bottom layer (526). The SWG 527 is configured to work as a reflective polarizing beam splitter, consistent with the principle of rigorous coupled-wave theory.

14 Claims, 15 Drawing Sheets

LIGHT GUIDE DEVICE AND BACKLIGHT MODULE THEREWITH

CROSS-REFERENCE TO RELATED APPLICATIONS

This application is related to the following commonly-assigned, applications: entitled, "LIGHT GUIDE PLATE AND BACKLIGHT MODULE THEREWITH", with application Ser. No. 11/309,236, filed on Jul. 17, 2006 and "LIGHT GUIDE PLATE HAVING HIGH UTILIZATION OF LIGHT ENERGY AND BACKLIGHT MODULE ADOPTING THE SAME", with application Ser. No. 11/454,489, filed on Jun. 16, 2006. The disclosure of the above identified applications are incorporated herein by reference.

FIELD OF THE INVENTION

The present invention relates to backlight modules used in liquid crystal displays (LCDs) and, more particularly, to a light guide device with a function of converting polarization light and a backlight module adopting the light guide device.

DESCRIPTION OF RELATED ART

LCDs are widely used in a range of electronic productions. In an LCD device, liquid crystal is a substance that does not itself radiate light. Instead, the liquid crystal relies on receiving light from a light source to thereby display images and data. In the case of a typical LCD device, a backlight module powered by electricity supplies the needed light.

Referring to FIG. 14, a conventional LCD device 100 includes an LCD panel 10 and a backlight module 20 positioned under the LCD panel 10 for supplying light thereto. The backlight module 20 includes a light source 21, a light guide plate 22, a reflecting sheet 23, a diffusion sheet 24, and a prism sheet 25. Two polarized sheets 11 and 12 are located on the top and bottom surface of the LCD panel 10, respectively. The light source 21 is arranged facing the light input surface 26 of the light guide plate 22. These optical sheets are arranged in the proceeding bottom-up order: the reflecting sheet 23, the light guide plate 22, the diffusion sheet 24, and the prism sheet 25.

In the backlight module 20, a light emitted from the light source 21 transmits through the light guide plate 22, reflecting sheet 23, diffusion sheet 24 and the prism sheet 25, in sequence, and then is convened into a planar light T. The planar light T includes a P polarized light and an S polarized light. The P polarized light is parallel to a light axis of the polarized sheet 12, and the S polarized light is perpendicular thereto. While the planar light T transmits through the polarized sheet 12, only the P polarized light can transmit thereoutof and the S polarized light is reflected and/or absorbed thereby. Accordingly, only 50% light is used, thereby reducing the utilization efficiency of light energy.

Referring to FIG. 15, another conventional LCD device 300 includes an LCD panel 30 and a backlight module 40 positioned under the LCD panel 10 for supplying light thereto. The backlight module 40 includes a light source 41, a light guide plate 42, a reflecting sheet 43, a diffusion sheet 44, a prism sheet 45, a quarter wavelength plate 46, and a reflective polarizing beam splitter (PBS) 47. Two polarized sheets 31 and 32 are located on the top and bottom surface of the LCD panel 30, respectively. The light source 41 is arranged facing the light input surface 48 of the light guide plate 42. These optical sheets are arranged in the bottom-up order of the reflecting sheet 43, the quarter wavelength plate 46, the light guide plate 42, the diffusion sheet 44, the prism sheet 45, and the reflective PBS 47.

In operation, the light source 41 emits a multiple wavelengths of light. A portion of the light transmits through the light guide plate 42, the diffusion sheet 44 and the prism sheet 45 and then is converted into a plane light T. The plane light T includes a P polarized light and an S polarized light. The P polarized light transmits through the reflective PBS 47 and the polarized sheet 32 and optically couples into the LCD panel 30. The reflective PBS 47 reflects the S polarized light back into the backlight module 40. The S polarized light is converted into a P polarized light P1 by passing twice through the quarter wavelength plate 46. The P polarized light P1 transmits through the reflective PBS 47 and the polarized sheet 32 and optically couples into the LCD panel 30. Finally, both P and S polarized light are utilized to illuminate the LCD panel 30. This configuration improves the utilization efficiency of light energy.

When the backlight module 40 is used in a color LCD device, the reflective PBS 47 and the polarized sheet 32 must work for multiple wavelengths of light. An achromatic quarter wavelength plate works instead of the quarter wavelength plate 46 to achieve the equal phase retardation for each wavelength light.

In this configuration, the light is reflected by the quarter wavelength plate and is then frequently refracted and diffused by the surfaces of the light guide plate. Thus, a portion of light is unavoidably consumed, and thereby the utilization efficiency of light energy is reduced.

SUMMARY OF THE INVENTION

A backlight module includes a light source for emitting light, a light guide device adjacent to the light source, a reflecting sheet on the bottom of the light guide device and a sub-wavelength grating on the top of the light guide device. The light guide device has a light guide substrate, which includes a light input surface, a light output surface adjacent to the light input surface, and a reflective surface opposite to the light output surface. Two orthogonal stresses or strains are formed in the light guide substrate. An angle between one stress or strain and a light input surface of light guide plate is configured to be in the range from 0 to 90 degrees, and a phase retardation due to a stresses or stains difference is defined by the equation:

$$\delta = 2\pi C \Delta \sigma L / \lambda = 2k\pi + \pi$$

wherein $\delta$ represents the phase retardation value, L represents double a thickness of the light guide plate, C represents a stress or strain optical coefficient, $\Delta\sigma$ represents the stress or strain difference, and $\lambda$ represents a wavelength of an incident light.

Other advantages and novel features of the present light guide plate and the backlight module therewith will become more apparent from the following detailed description of preferred embodiments when taken in conjunction with the accompanying drawings.

BRIEF DESCRIPTION OF THE DRAWINGS

Many aspects of the present light guide device and the backlight module therewith can be better understood with reference to the following drawings. The components in the drawing are not necessarily drawn to scale, the emphasis instead be placed upon clearly illustrating the principles of the present backlight module. Moreover, in the drawings, like reference numeral designate corresponding parts throughout the several views.

DETAILED DESCRIPTION OF THE INVENTION

Reference will now be made to the drawings to describe preferred embodiments of the present light guide device and the present backlight module incorporating such a light guide device, in detail.

Figure 1:
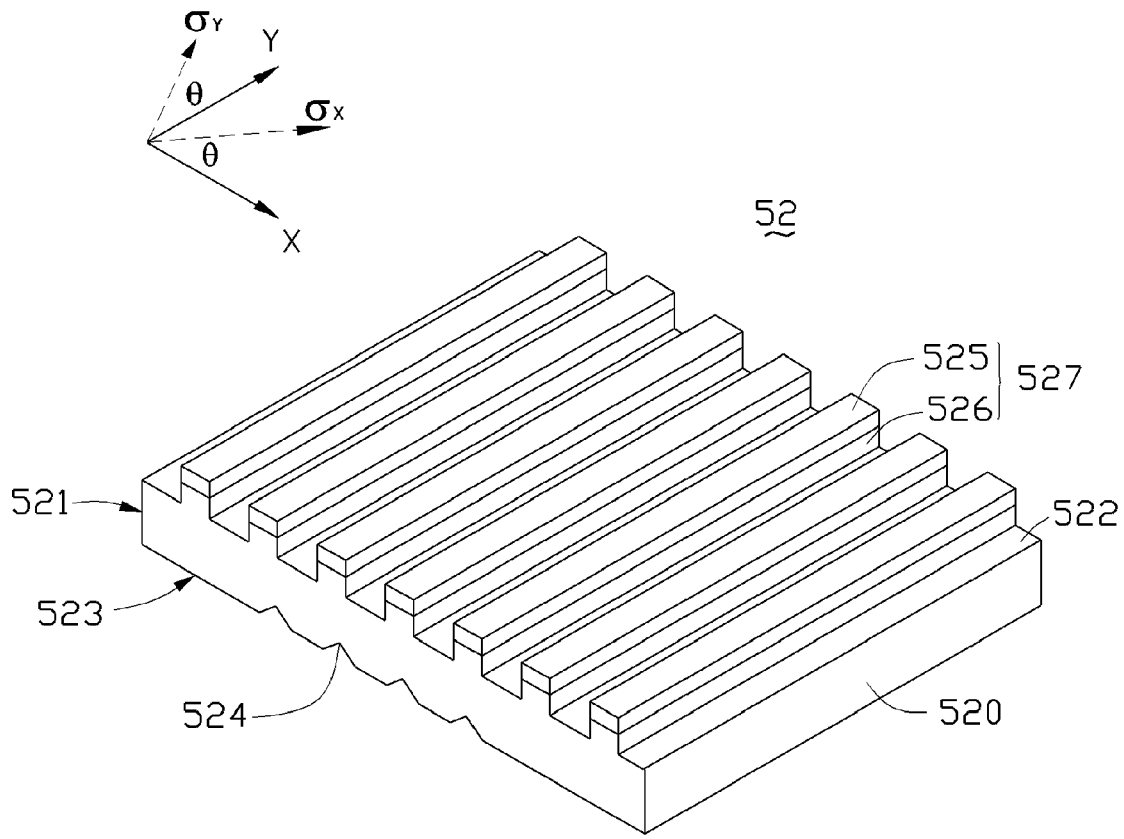
FIG. 1 is an isometric view of a light guide device, according to a first preferred embodiment.

FIG. 1 shows an isometric view of a light guide device 52, according to a first embodiment. The light guide device 52 includes a light guide substrate or plate 520 and a sub-wavelength grating (SWG) 527. The light guide substrate 520 includes a light input surface 521, a light output surface 522 adjacent to the light input surface 521, a bottom surface 523 opposite to the light output surface 522. The light guide substrate 520 is advantageously made of polymethyl methacrylate (PMMA). The sub-wavelength grating 527 has a top layer 525 and a bottom layer 526. The bottom layer 526 is located, in the illustrated embodiment, directly on the light output surface 522 and is beneficially made of the same material as that used for the light guide substrate. The top layer 525 is made of aluminum (Al). A number of microstructures 524 are located on the bottom surface 523. Advantageously, each microstructure 524 is in a shape of a V-shaped groove and, particularly usefully, each has an apex of about 72 degrees.

In the light guide device 52, a stress-induced birefringence is introduced to realize S-P polarized light conversion, relying upon the principle of a photoelastic effect and a stress is optimized. The stress-optical law of the plane photoelasticity can be expressed as $$\Delta n = n_{\sigma y} - n_{\sigma x} = C\Delta\sigma \quad (1)$$

The amount of produced birefringence ($\Delta n$) is proportional to the stress difference ($\Delta\sigma = \sigma_Y \sigma_X$), provided the stress is not too large. C indicates the stress-optical coefficient.

Figure 2:
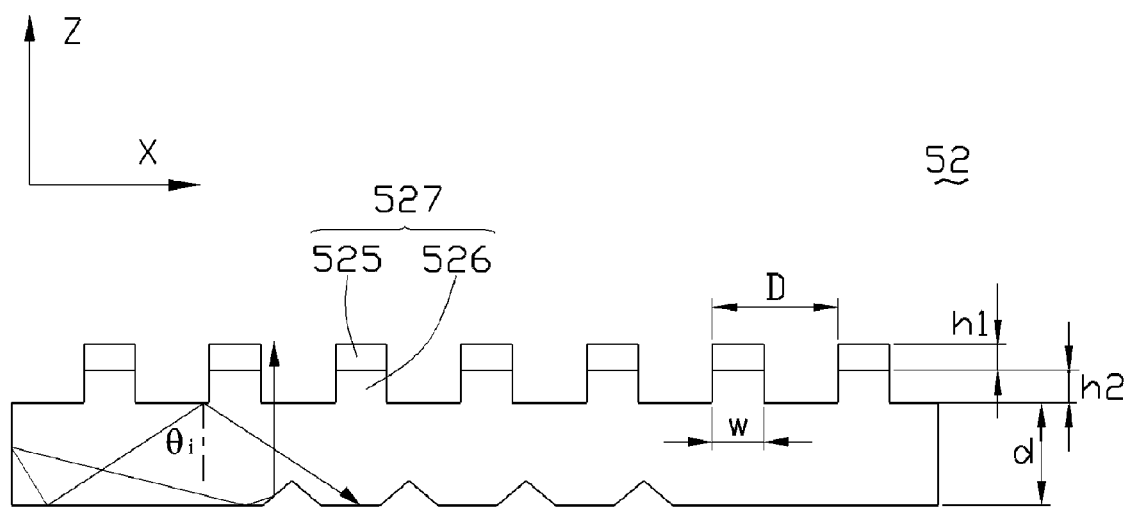
FIG. 2 is a light path view of the light guide device of FIG. 1.

As shown in FIGS. 1 and 2, an X axis is defined perpendicular to the light input surface 521, and a Y axis is defined parallel to the light output surface 522 and perpendicular to the X axis. The stress is applied along a $\sigma_X$ axis and $\sigma_Y$ axis, respectively. The $\sigma_X$ axis is perpendicular to the $\sigma_Y$ axis, and an angle between the $\sigma_X$ axis and the X axis is denoted as $\theta$. The angle $\theta$ is in a range of above about 0 to less than about 90 degrees (i.e., a discernable angle that is less than absolute orthogonal), and the preferred angle $\theta$ of the present light guide device 52 is about 45 degrees. The thickness of the light guide substrate 520 is denoted as d. The phase retardation value $\delta$ of light passing through the light guide substrate 520 can be written as $$\delta = 2\pi C\Delta\sigma L/\lambda \quad (2)$$

where $\lambda$ denotes the wavelength of the incident light, and L=2 d (i.e., twice the thickness). In X-Y coordinate, the Jones matrix T can be expressed as $$T = R(\beta)T_\sigma R(-\beta) = \begin{bmatrix} \cos\theta & -\sin\theta \\ \sin\theta & \cos\theta \end{bmatrix} \begin{bmatrix} 1 & 0 \\ 0 & e^{j\delta} \end{bmatrix} \begin{bmatrix} \cos\theta & \sin\theta \\ -\sin\theta & \cos\theta \end{bmatrix} \quad (3)$$

The incident Y directional polarized light can be written as $$E_1 = A\begin{bmatrix} 0 \\ 1 \end{bmatrix},$$

wherein A denotes the light wave amplitude. The light passed the substrate twice can be written as $$E_0 = \begin{bmatrix} E_{ox} \\ E_{oy} \end{bmatrix} = TE_1 = A\begin{bmatrix} \sin\theta\cos\theta - \sin\theta\cos\theta e^{j\delta} \\ \sin^2\theta + \cos^2\theta e^{j\delta} \end{bmatrix} \quad (4)$$

The intensity of the X directional polarized light transmitted from a SWG 527 is $$I = A^2 \sin^2 2\theta \sin^2(\delta/2) = A^2 \sin^2 2\theta \sin^2(\pi C\Delta\sigma L/\lambda). \quad (5)$$

Under the conditions of $$\begin{cases} \theta = \pi/4 \\ \delta = 2k\pi + \pi_{k=0,1,2,3,4,\ldots} \end{cases} \quad (6)$$

Light can emit trough the light output surface 522 when light incidence angle $\theta_1$ is small enough. The microstructure 524 is structured and arranged for achieving a desired light incidence angle $\theta_1$. In the present embodiment, the light incidence angle $\theta_1$ is 0 degrees.

In x-y coordinate, the Jones matrix T can be expressed as $$T = R(\beta)T_G R(-\beta) = \begin{bmatrix} \cos\theta & -\sin\theta \\ \sin\theta & \cos\theta \end{bmatrix}\begin{bmatrix} 1 & 0 \\ 0 & e^{j\delta} \end{bmatrix}\begin{bmatrix} \cos\theta & \sin\theta \\ -\sin\theta & \cos\theta \end{bmatrix} \qquad 5$$

The incident y-directional polarized light can be written as $$E_i = A\begin{bmatrix} 0 \\ 1 \end{bmatrix},$$

wherein A denotes the light wave amplitude. The light passed the substrate twice can be written as $$E_0 = \begin{bmatrix} E_{ox} \\ E_{oy} \end{bmatrix} = TE_i = A\begin{bmatrix} \sin\theta\cos\theta - \sin\theta\cos\theta e^{j\delta} \\ \sin^2\theta + \cos^2\theta e^{j\delta} \end{bmatrix}$$

The intensity of the x-directional polarized light transmitted from a SWG 527 is $$I = A^2 \sin^2 2\theta \sin^2(\delta/2) = A^2 \sin^2 2\theta \sin^2(\pi C \Delta\sigma L/\lambda).$$

Under the conditions of $$\begin{cases} \theta = \pi/4 \\ \delta = 2k\pi + \pi_{k=0,1,2,3,4,\ldots} \end{cases}$$

The intensity achieves the maximum value $A^2$, and the efficiency of polarization conversion is almost 100%. Eq. (6) means that the light guide substrate 520 with applied stress is similar in effect as the quarter wavelength retardation plate. As the achromatic backlight system, the phase retardation value should be close to $2k\pi+\pi$ for the multiple wavelengths of $\lambda_R$ (656.3 nm), $\lambda_G$ (589.3 nm) and $\lambda_B$ (486.1 nm). Hence, the stress difference $\Delta\sigma$ should be optimized. The optimization problem can be expressed by the minimum of objective function as $$y = \min_{\Delta\sigma}\{w_R \times \text{abs}[\text{mod}(\delta_R, 2\pi) - \pi] + w_G \times \text{abs}[\text{mod}(\delta_G, 2\pi) - \pi] + w_B \times \text{abs}[\text{mod}(\delta_B, 2\pi) - \pi]\}$$

where mod denotes modules after division, abs returns absolute value, and $\delta_R$, $\delta_G$ and $\delta_B$ denote the phase retardation values for wavelengths of $\lambda_R$, $\lambda_G$ and $\lambda_B$, respectively. $w_R$, $w_G$ and $w_B$ denote statistical weighting factors of the light of wavelengths of $\lambda_R$ (656.3 nm), $\lambda_G$ (589.3 nm) and $\lambda_B$ (486.1 nm), respectively. In the present light guide device 52, all the weight factors are set to 1.0.

Figure 3:
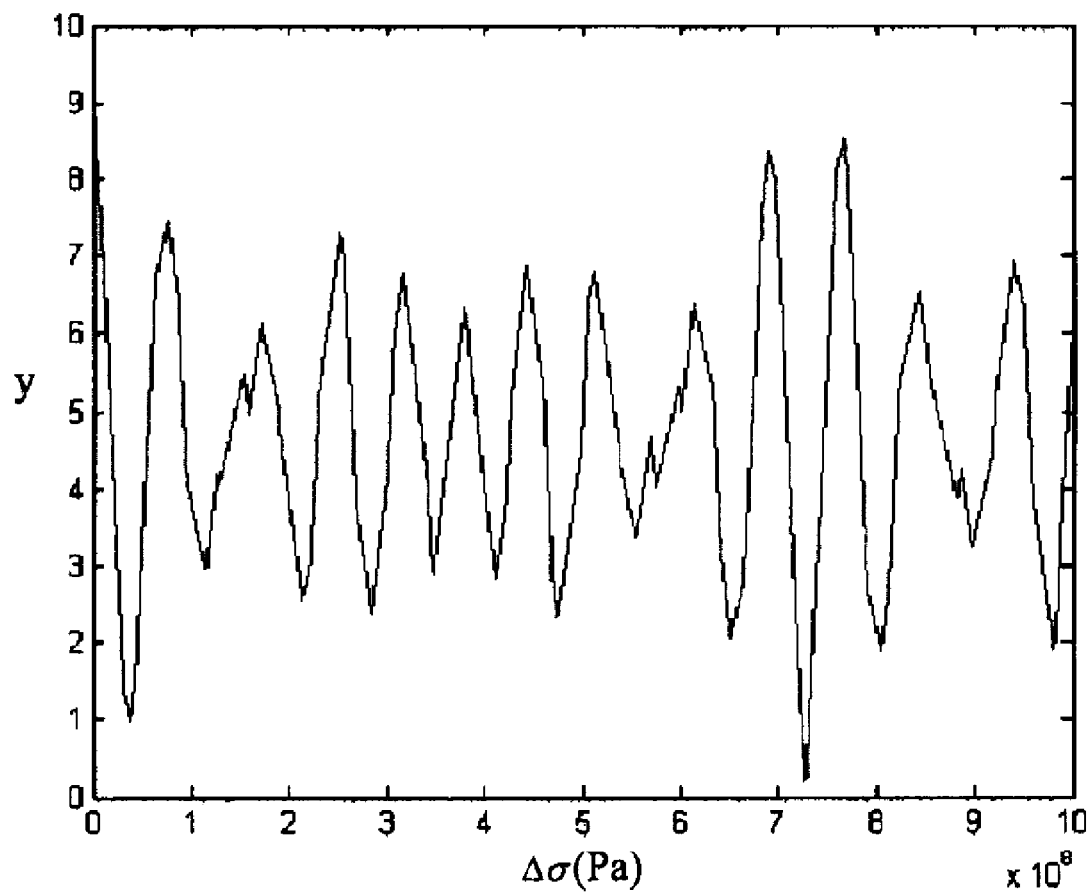
FIG. 3 is an objective function value—stress difference graph of the light guide device, according to the first embodiment.
Figure 4:
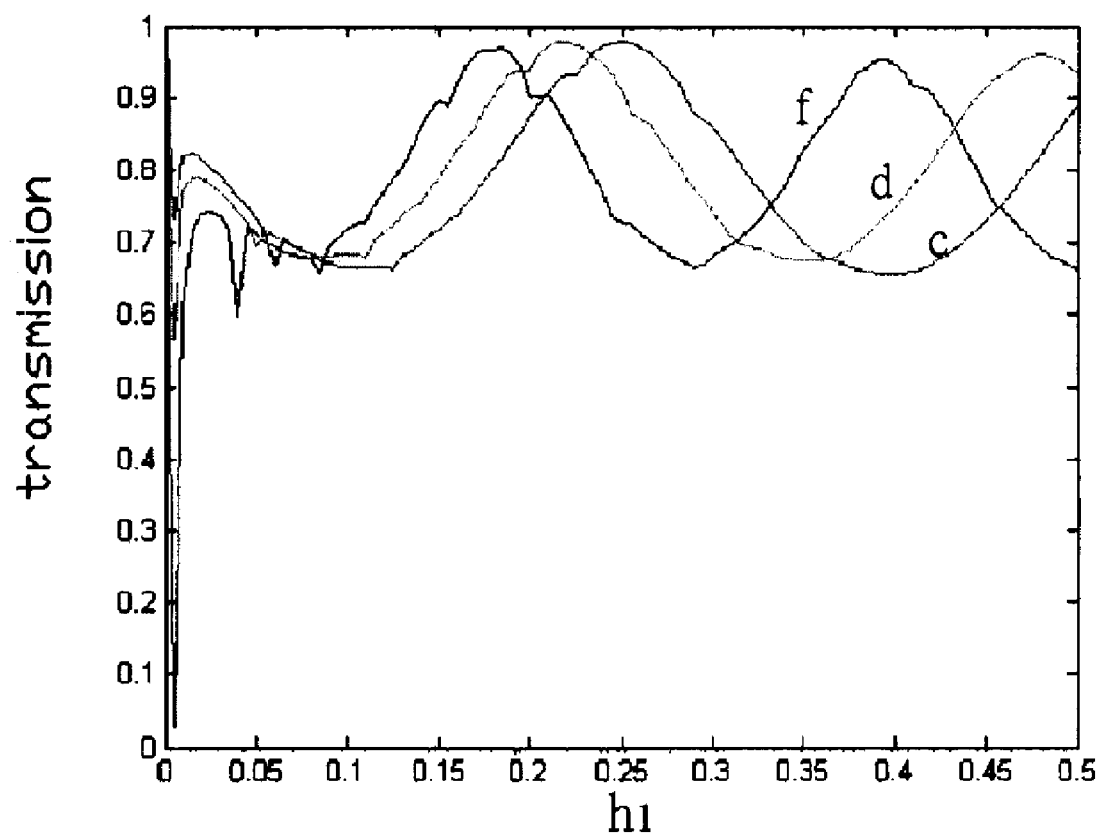
FIG. 4 is a thickness of a top layer of a sub-wavelength grating—P polarized light transmission graph of the light guide device, according to the first preferred embodiment.
Figure 5:
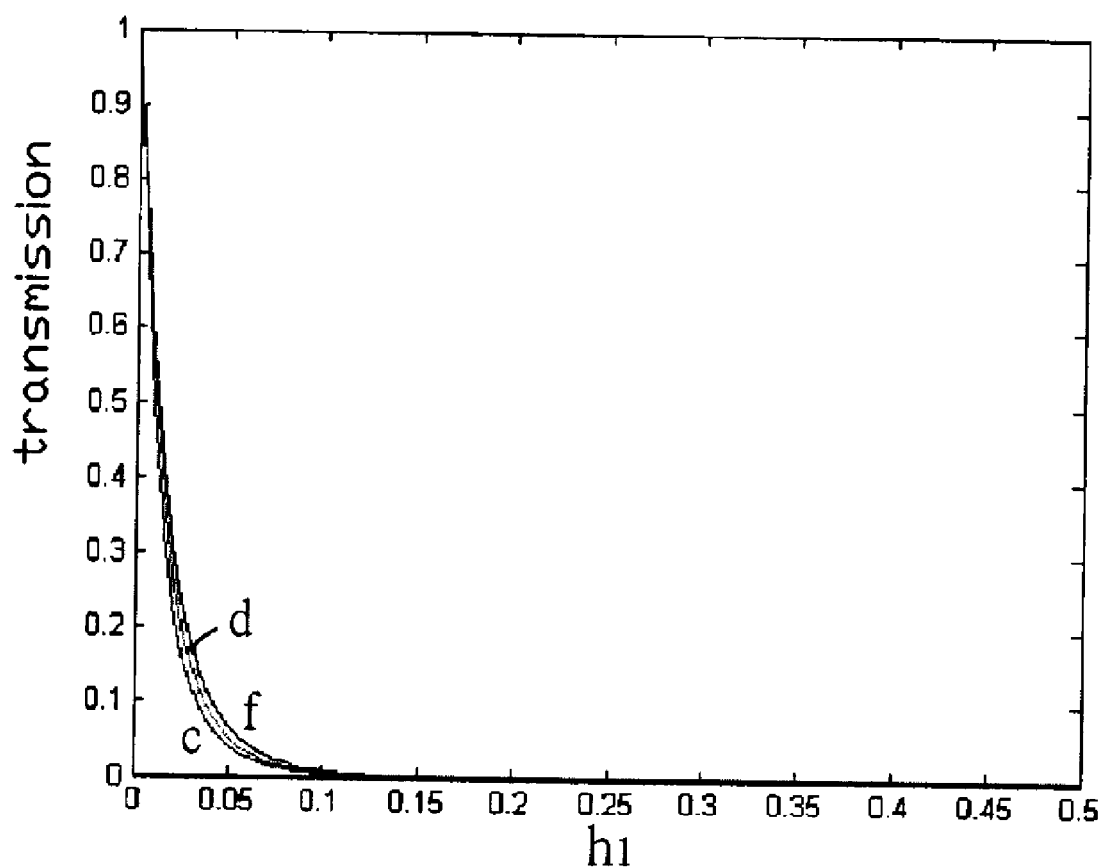
FIG. 5 is a thickness of a top layer of a sub-wavelength grating—S polarized light transmission graph of the light guide device, according to the first preferred embodiment.
Figure 6:
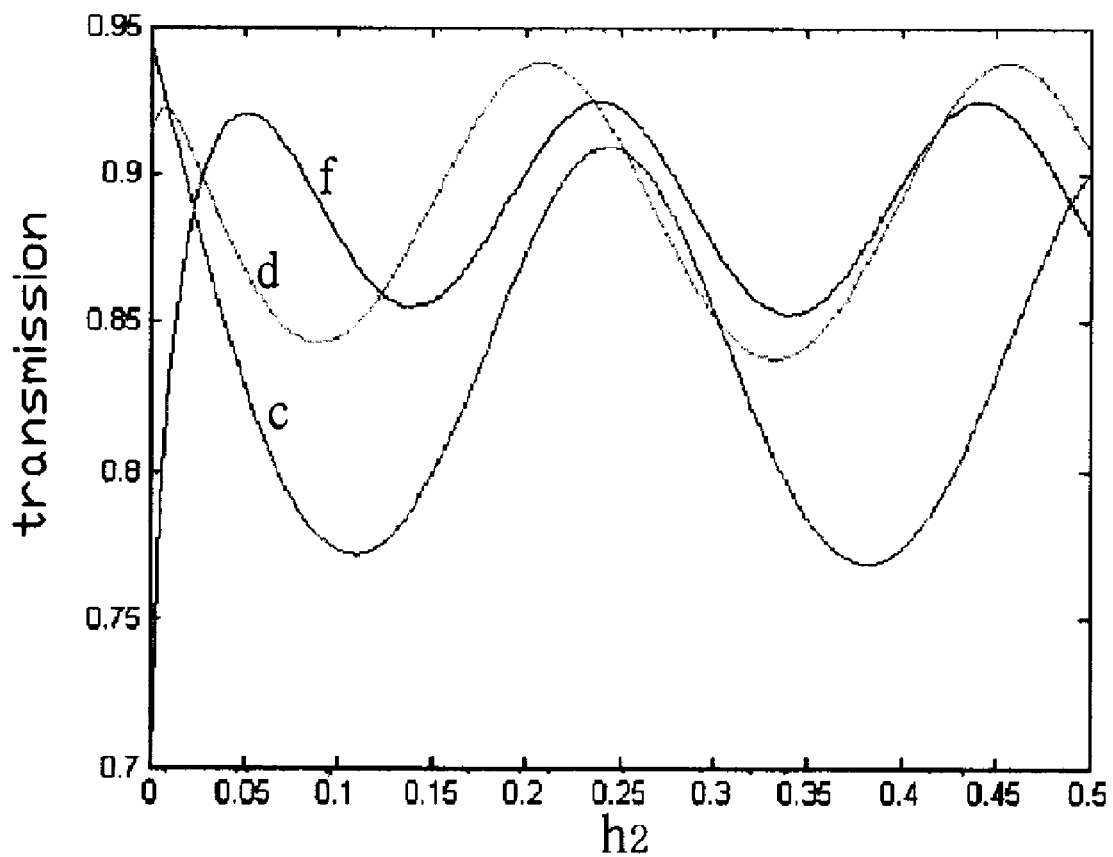
FIG. 6 is a thickness of a bottom layer of a sub-wavelength grating—P polarized light transmission graph of the light guide device, according to the first preferred embodiment.
Figure 7:
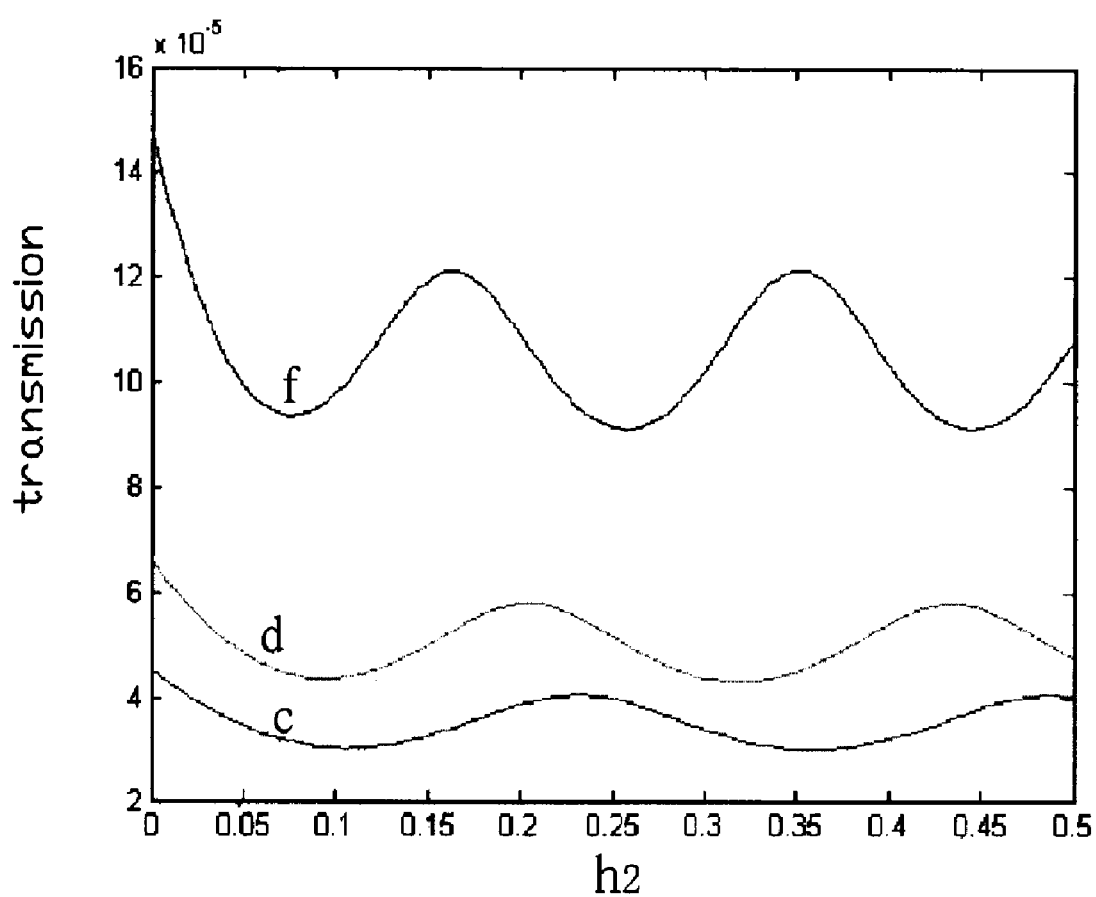
FIG. 7 is a thickness of a bottom layer of a sub-wavelength grating—S polarized light transmission graph of the light guide device, according to the first preferred embodiment.

The preferred thickness of the present light guide substrate is 0.8 mm. The light guide substrate 520 is made of PMMA, so the stress-optical coefficient C is $4.8\times10^{-12}$ Pa$^{-1}$. The objective function values with respect to the stress difference are plotted in FIG. 3. When $\Delta\sigma=7.28\times10^8$ Pa, the local minimum value of Eq. (7) is obtained. The phase retardations of the light of the wavelength of $\lambda_R$ (656.3 nm), $\lambda_G$ (589.3 nm) and $\lambda_B$ (486.1 nm) are:

$$\begin{cases} \delta_R = 16\pi + 1.04\pi \\ \delta_G = 18\pi + 0.98\pi \\ \delta_B = 22\pi + 1.0\pi \end{cases}$$

Compared with the ideal achromatic wave plate, the maximum error is only about 4%. At $\theta=\pi/4$ (i.e., 45°), Eq. (5) indicates that the polarization conversion efficiency of the present light guide substrate 520 is more than 99%. The 4% error of phase retardation only leads to a 1% decrease in conversion efficiency. The light guide substrate 520 with applied stress can realize the polarization conversion, and the quarter wavelength plate can be left out. The stress-induced birefringence can remain in the light guide substrate 520 by using stress-freezing techniques. In a similar fashion, a strain-induced birefringence can be applied to achieve the polarization conversion, too.

The SWG 527 is located on the light output surface 522. The SWG 527 is configured to effectively operate as a reflective polarizing beam splitter, operating in accordance with the principle of rigorous coupled-wave theory. The SWG 527 transmits P polarized light and reflects S polarized light. In the SWG, a period is defined as D, a width is defined as w, a duty cycle (DC) is defined as f (f=w/D), a height of a top layer 525 is defined as h1, a height of a bottom layer 526 is defined as h2. The SWG is optimized to achieve the maximum transmission for the P polarized light and the minimum transmission for the S polarized light the maximum extinction ratio, and achromatism.

Referring to FIGS. 4 to 7, the height of the top layer 525 h1 is in a range from 0.200 to 0.210 μm, the height of the bottom layer 526 h2 is in a range from 0.230 to 0.250 μm. The period of the SWG 527 is 0.2 μm. The duty cycle is in an approximate range from 0.2 to 0.8, and the preferred duty cycle is 0.5 for convenient processing.

Figure 8:
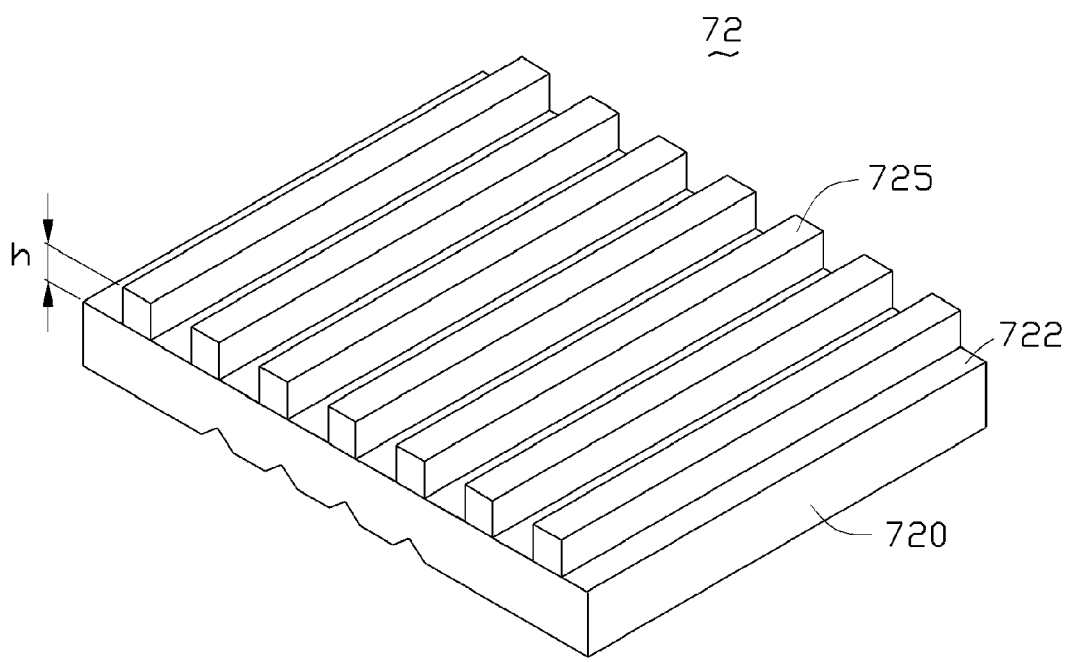

FIG. 8 is an isometric view of a light guide device, according to a second preferred embodiment. A light guide device 72 in accordance with a second preferred embodiment is the same as the first preferred embodiment, except that a light guide substrate or plate 720 of the light guide device 72 is made of polycarbonate (PC) and a SWG 725 located on the light output surface 722 of the light guide substrate 720 includes a single layer. The single layer is made of aluminum.

Figure 9:
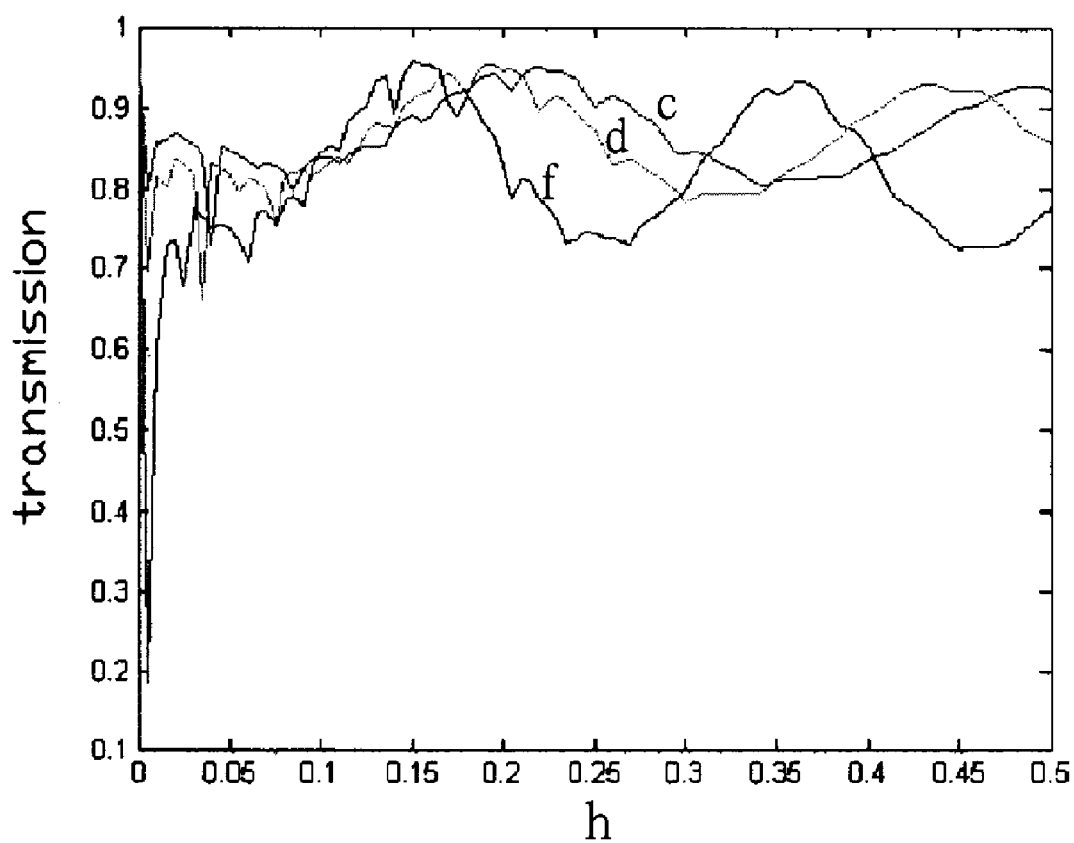
FIG. 9 is a thickness of a sub-wavelength grating—P polarized light transmission graph of the light guide device, according to the second preferred embodiment.
Figure 10:
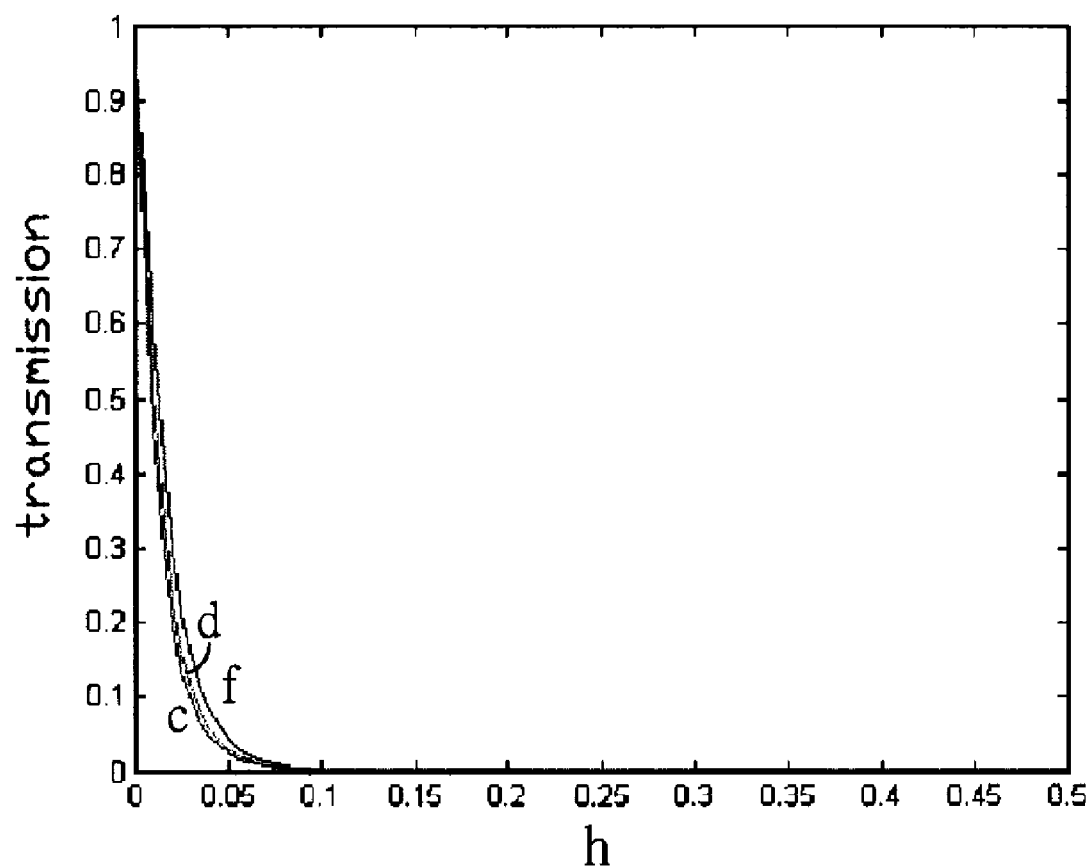
FIG. 10 is a thickness of a sub-wavelength grating—S polarized light transmission graph of the light guide device, according to the second preferred embodiment.
Figure 11:
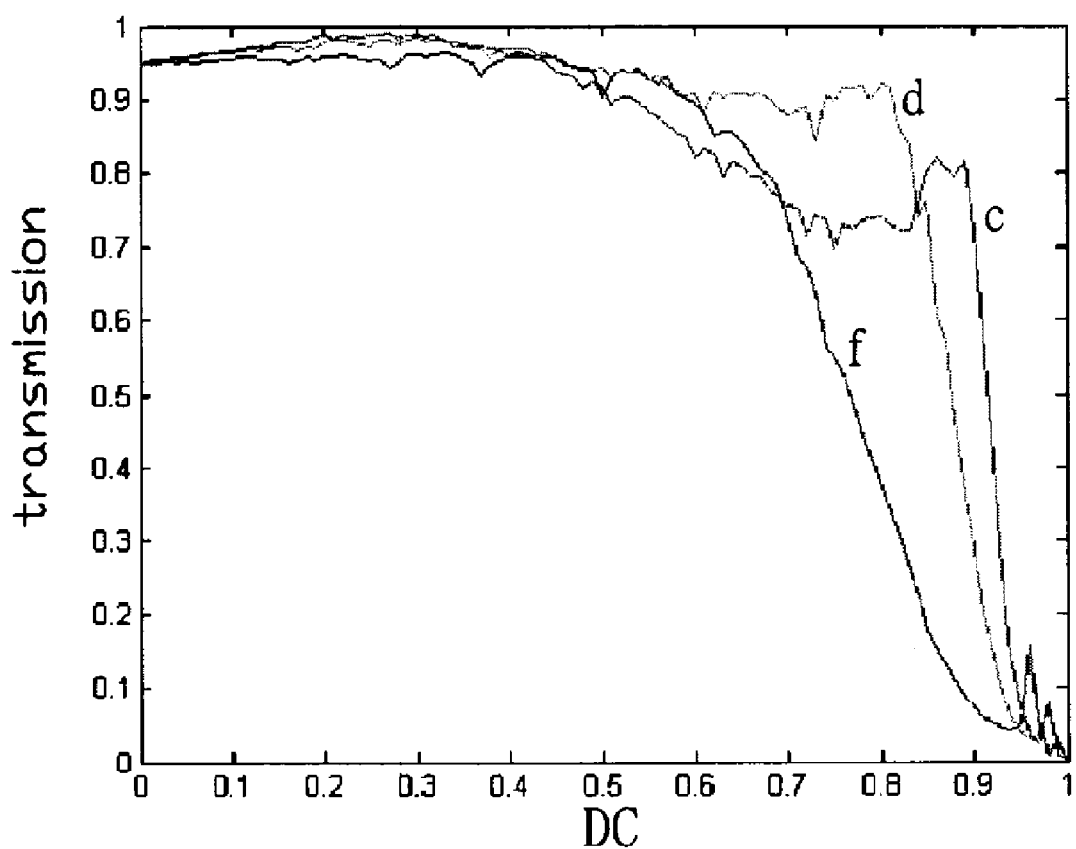
FIG. 11 is a duty cycle of a sub-wavelength grating—P polarized light transmission graph of the light guide device, according to the second preferred embodiment.
Figure 12:
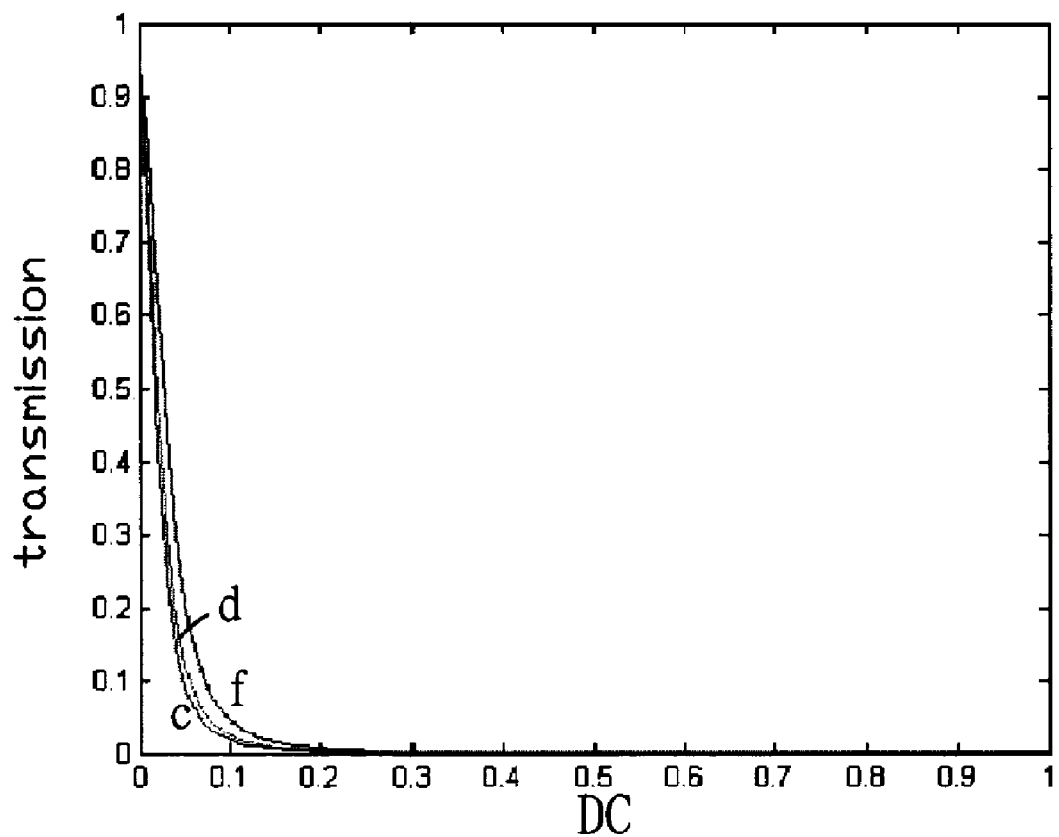
FIG. 12 is a duty cycle of a sub-wavelength grating—S polarized light transmission graph of the light guide device, according to the second preferred embodiment.

Referring to FIGS. 9 and 10, a period of the present SWG is 0.2 μm. A height h of the present SWG 725 is in a range from 0.16 to 0.18 μm. Referring to FIGS. 11 and 12, a duty cycle of the present SWG 725 is in a range from 0.3 to 0.7, and the preferred duty cycle is 0.5 for convenient processing.

Figure 13:
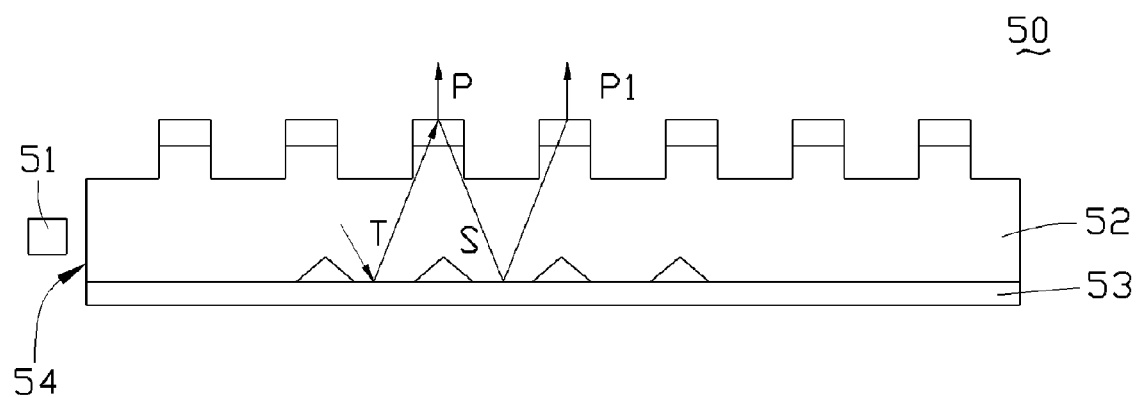
FIG. 13 is a schematic plan view of a backlight module, according to a third preferred embodiment.
Figure 14:
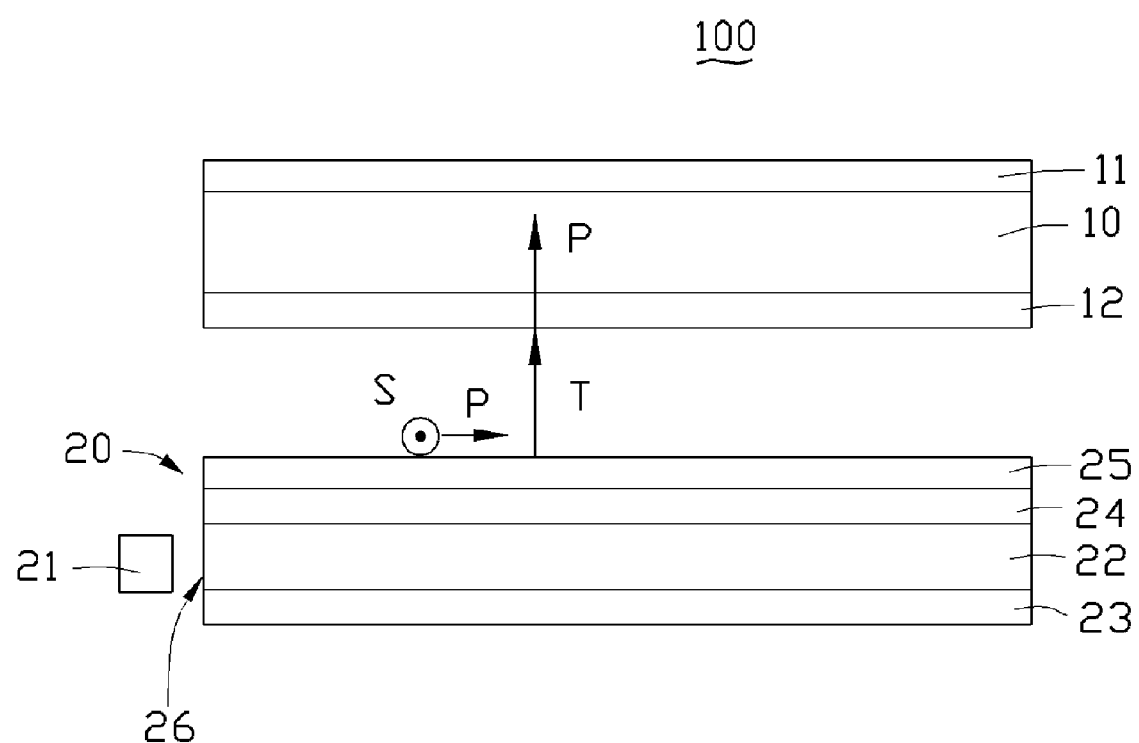
FIG. 14 is a schematic plan view of a conventional LCD device, including a backlight module and an LCD panel.
Figure 15:
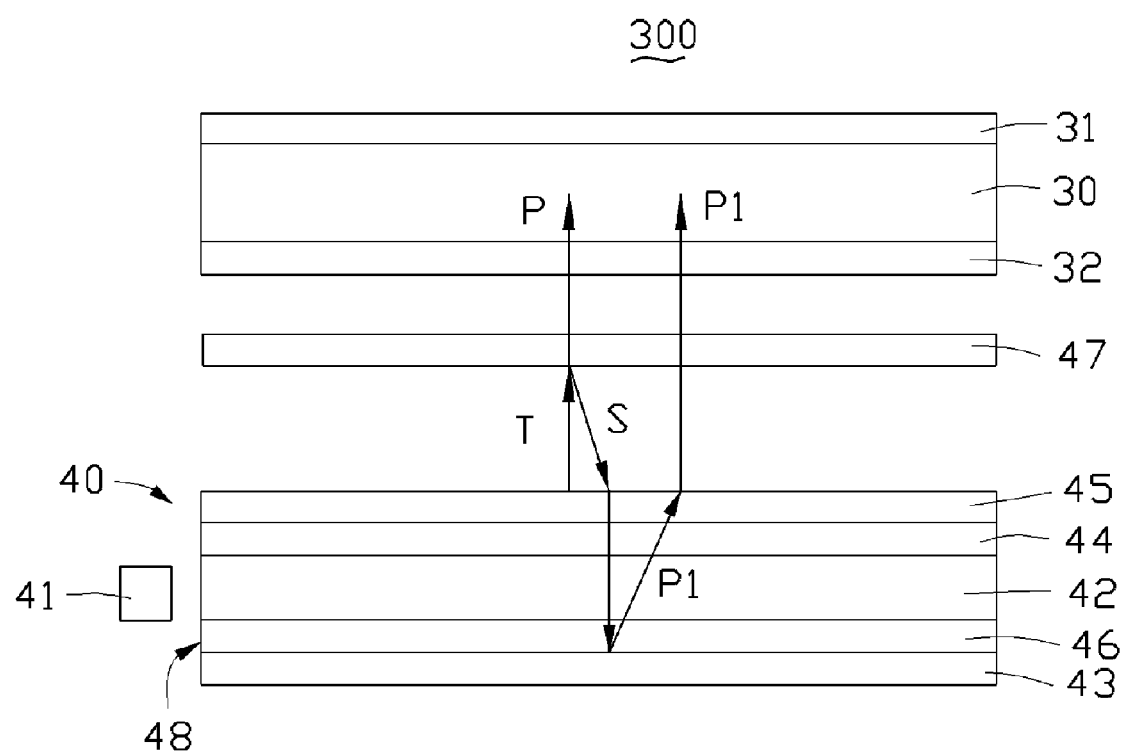
FIG. 15 is a schematic plan view of another conventional LCD device, including a backlight module and an LCD panel.

FIG. 13 is a schematic plan view of a backlight module according to a third preferred embodiment. A backlight module 50 with the light guide device 52 further includes a light source 52 and a reflective sheet 53. The light source 51 facing a light input surface 54 of the light guide device 52 is a LED, and the reflective sheet 53 is located on the bottom surface of the light guide device 52.

In use, the light source 51 of the present backlight module 50 emits a multiple wavelengths of light. The light includes a P polarized light and an S polarized light. The light passes through the light guide substrate and is reflected by the reflective sheet 53 and then is projected onto the SWG. The P polarized light can transmit out of the SWG and then illuminates an LCD panel (not shown). The SWG reflects the S polarized light back into the backlight module 50. Therefore, the S polarized light transmits through the light guide device 52 twice, is converted into another P polarized light P1, and then can transmit out of the SWG. Finally, all of the light emitted from the light source 51 can be utilized. The assembly of the backlight module 50 and the light guide device 52 can convert and utilize the multiple-wavelength light to illuminate the LCD panel, so the utilization efficiency of light energy is improved. The integration of the backlight module is improved, eliminating the need for a reflective polarizing beam splitter.

The present light guide device may have other embodiments, such as the following example.

The light guide device is made of polycarbonate (PC). The SWG on the light output surface includes a top layer and a bottom layer, the bottom layer being made of polycarbonate (PC) and the top layer being made of aluminum (Al) or another highly reflective metal. The preferred period of the SWG is 0.2 µm, the height of the top layer is in a range of about from 0.200 to 0.215 µm, while the height of the bottom layer is in an approximate range from 0.220 to 0.235 µm.

The shape of the light guide substrate of the light guide device could instead be that of a wedge.

The microstructure on the bottom of the light guide device is, alternatively, one of a cylindrical shape, a hemispherical shape, a pyramidal shape, a cubic shape, a cuboid shape, and so on. The microstructures may be distributed uniformly, or the heights thereof and/or the distances therebetween can increase with increasing distance from the light input surface.

The light guide plate may instead be made of a material selected from a group consisting of optical glass and plastic, the plastic being, e.g., a material such as polymethyl methacrylate (PMMA), polystyrene (PS), polysulfone, or polyetherimide.

The wavelength of light is not limited to the wavelengths mentioned above, and the stress difference may be optimized according to the corresponding wavelength.

The period of the present SWG adopts the maximum for convenient processing. The period of the SWG may be reduced to achieve a more excellent property (i.e., improved performance), according to the chosen process conditions.

The SWG may include multiple layers.

It is clear that a birefringence light guide plate can also be achieved by optimizing the strain in the manner of the principle of the photoelastic effect, similar with the present stress optimizing process.

The present backlight module may have also other embodiments, such as the following example.

The light source may be, for example, a cold cathode fluorescent lamp (CCFL). The SWG may be arranged between the light output surface and the diffusion sheet or between the diffusion sheet and prism sheet. The shape of microstructures may be cylindrical, hemispherical, cubic, cuboid, pyramidal and so on. The backlight module may adopt other embodiments of the present light guide device.

Finally, it is to be understood that the embodiments mentioned above are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A light guide device, comprising:
a light guide substrate having a light input surface, a light output surface adjacent to the light input surface, a reflective surface opposite to the light output surface, and a plurality of microstructures formed on the reflective surface, the light guide substrate capable of generating phase retardation as a quarter wavelength retardation plate; and
a sub-wavelength grating located on the light output surface;
wherein two orthogonal stresses or strains in the light guide substrate form an angle in a range more than 0 and less than 90 degrees between one stress or strain and the light input surface of the light guide substrate; and
further, a phase retardation due to the stress or strain difference is defined by the equation:

$$\delta=2\pi C\Delta\sigma L/\lambda=2k\pi+\pi k=0,1,2,3,4$$

wherein $\delta$ represents the phase retardation value, L represents double a thickness of the light guide substrate, C represents a stress or strain optical coefficient, $\Delta\sigma$ represents a stress or strain difference, and $\lambda$ represents a wavelength of an incident light.

2. The light guide device as defined in claim 1, wherein each microstructure is in a shape of a V-shaped groove.

3. The light guide device as defined in claim 1, wherein the sub-wavelength grating includes a top layer and a bottom layer, the top layer being made of aluminum, the bottom layer and the light guide substrate being made of the same material.

4. The light guide device as defined in claim 3, wherein the light guide substrate is made of polymethyl methacrylate, the top layer of the sub-wavelength grating having an approximate thickness from 0.200 to 0.210 µm, the bottom layer of the sub-wavelength grating having a thickness of about from 0.230 to 0.250 µm.

5. The light guide device as defined in claim 4, wherein a period of the sub-wavelength grating is about 0.2 µm, and a duty cycle of the sub-wavelength grating is about in a range from 0.2 to 0.8.

6. The light guide device as defined in claim 3, wherein the light guide substrate is made of polycarbonate, the top layer of the sub-wavelength grating having an approximate thickness from 0.200 to 0.215 µm, the bottom layer of the sub-wavelength grating having a thickness about from 0.220 to 0.235 µm.

7. The light guide device as defined in claim 6, wherein a period of the sub-wavelength grating is about 0.2 µm, and a duty cycle of the sub-wavelength grating is about in a range from 0.2 to 0.8.

8. The light guide device as defined in claim 1, wherein the sub-wavelength grating includes a single layer, the single layer being made of aluminum and having an approximate thickness from 0.160 to 0.180 µm.

9. The light guide device as defined in claim 8, wherein the light guide substrate is made of polycarbonate, a period of the sub-wavelength grating being about 0.2 µm, a duty cycle of the sub-wavelength grating being about in a range from 0.3 to 0.7.

10. The light guide device as defined in claim 1, wherein the light guide substrate and the sub-wavelength grating are integrally located.

11. The light guide device as defined in claim 1, wherein light passing through the light guide substrate has a phase retardation.

12. The light guide device as defined in claim 1, wherein S-polarized light transmitting through the light guide device twice is converted into P-polarized light.

13. A backlight module comprising:
a light source for emitting light;
a light guide device adjacent to the light source;
a reflecting device on the bottom of the light guide device; and
a sub-wavelength grating on the top of the light guide device;

wherein the light guide device comprises a light guide substrate including a light input surface, a light output surface adjacent to the light input surface, a reflective surface opposite to the light output surface, and a plurality of microstructures formed on the reflective surface, the light guide substrate being capable of generating phase retardation as a quarter wavelength retardation plate, and the sub-wavelength grating being located on the light output surface;

further wherein two orthogonal stresses or strains occur in the light guide substrate, an angle in the range more than 0 degrees and less than 90 degrees existing between one stress or strain and the light input surface of the light guide substrate;

a phase retardation due to the stress or strain difference being defined by the equation:

$$\delta = 2\pi C \Delta \sigma L / \lambda = 2k\pi + \pi k = 0, 1, 2, 3, 4$$

wherein $\delta$ represents the phase retardation value, L represents double the thickness of the light guide substrate, C represent the stress or strain optical coefficient, $\Delta\sigma$ represents the stress or strain difference, and $\lambda$ represents wavelength of an incident light.

14. The backlight module as defined in claim 13, wherein the backlight module further comprises a diffusion sheet and a prism sheet positioned over the sub-wavelength grating.

* * * * *

UNITED STATES PATENT AND TRADEMARK OFFICE
CERTIFICATE OF CORRECTION

PATENT NO.       : 7,661,833 B2                                    Page 1 of 1
APPLICATION NO. : 11/309238
DATED            : February 16, 2010
INVENTOR(S)      : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this

Thirtieth Day of November, 2010

David J. Kappos
*Director of the United States Patent and Trademark Office*